US008416359B2

(12) United States Patent
Choi et al.

(10) Patent No.: US 8,416,359 B2
(45) Date of Patent: Apr. 9, 2013

(54) ARRAY SUBSTRATE FOR LIQUID CRYSTAL DISPLAY DEVICE AND METHOD OF FABRICATING THE SAME

(75) Inventors: Il-Man Choi, Buk-gu Daegu (KR); Tae-Hyeung Kim, Seoul (KR); Min-Jic Lee, Dong-gu Daegu (KR)

(73) Assignee: LG Display Co., Ltd., Seoul (KR)

( * ) Notice: Subject to any disclaimer, the term of this patent is extended or adjusted under 35 U.S.C. 154(b) by 167 days.

(21) Appl. No.: 12/845,573

(22) Filed: Jul. 28, 2010

(65) Prior Publication Data

US 2010/0289978 A1 Nov. 18, 2010

Related U.S. Application Data

(62) Division of application No. 11/824,041, filed on Jun. 29, 2007, now Pat. No. 7,787,068.

(30) Foreign Application Priority Data

Dec. 29, 2006 (KR) .............................. 2006-0137829

(51) Int. Cl.
*G02F 1/00* (2006.01)
(52) U.S. Cl. ............................................ 349/54; 349/61
(58) Field of Classification Search .................... 349/54, 349/61
See application file for complete search history.

(56) References Cited

U.S. PATENT DOCUMENTS

| | | | | |
|---|---|---|---|---|
| 5,532,853 A | * | 7/1996 | Song et al. | 349/149 |
| 6,429,909 B1 | * | 8/2002 | Kim et al. | 349/54 |
| 6,605,495 B1 | * | 8/2003 | Kuo | 438/151 |
| 6,833,882 B2 | | 12/2004 | Lee | |
| 6,985,194 B2 | * | 1/2006 | Kawano et al. | 349/54 |
| 7,417,692 B2 | * | 8/2008 | Lin | 349/38 |
| 7,733,431 B2 | * | 6/2010 | Lin | 349/38 |
| 2001/0028418 A1 | * | 10/2001 | Ozaki et al. | 349/54 |

(Continued)

FOREIGN PATENT DOCUMENTS

| | | |
|---|---|---|
| CN | 1142057 | 2/1997 |
| JP | 59-101693 | 6/1984 |

(Continued)

OTHER PUBLICATIONS

Office Action issued in corresponding Japanese Patent Application No. 2007-209563, mailed Oct. 20, 2010.

(Continued)

*Primary Examiner* — K. Cyrus Kianni
(74) *Attorney, Agent, or Firm* — Brinks Hofer Gilson & Lione

(57) ABSTRACT

Array substrates for liquid crystal display (LCD) devices are formed on a substrate with first and second gate lines crossing a data line to define first and second pixel regions. A thin film transistor includes a source electrode and a drain electrode. A metal pattern overlaps a common line and makes up a portion of the drain electrode. A passivation layer is disposed on the source and drain electrodes and on the metal pattern. A first pixel electrode is connected to the metal pattern and a common electrode is connected to the common line. Various repair patterns are formed to define one or more repairing portions that enable connection of the drain electrode or metal pattern to a second pixel electrode of the second pixel region if the cut line is cut in the event the first pixel electrode fails to display an image.

13 Claims, 8 Drawing Sheets

U.S. PATENT DOCUMENTS

| | | | |
|---|---|---|---|
| 2002/0140896 A1* | 10/2002 | Lee ................................. | 349/192 |
| 2002/0163602 A1* | 11/2002 | Lee ................................. | 349/43 |
| 2004/0141099 A1* | 7/2004 | Kim et al. ....................... | 349/43 |
| 2005/0195338 A1* | 9/2005 | Matsumoto et al. ............ | 349/40 |
| 2006/0285029 A1* | 12/2006 | Yoo et al. ......................... | 349/54 |
| 2007/0046848 A1* | 3/2007 | Jen et al. ......................... | 349/54 |
| 2007/0158655 A1* | 7/2007 | Lin ................................. | 257/72 |
| 2008/0157088 A1 | 7/2008 | Chen et al. | |

FOREIGN PATENT DOCUMENTS

| | | |
|---|---|---|
| JP | 01-297627 | 11/1989 |
| JP | 2002-090775 | 3/2002 |
| JP | 2002-278476 | 9/2002 |
| JP | 2003-315827 | 11/2003 |
| KR | 10-2001-0106862 | 12/2001 |
| KR | 10-2005-0058058 | 6/2005 |
| KR | 10-2005-0064753 | 6/2005 |
| KR | 2006072743 | 6/2009 |

OTHER PUBLICATIONS

Office Action issued in corresponding Chinese Patent Application No. 200710128225.5; issued Jun. 5, 2009.

Office Action issued in corresponding Korean Patent No. 10-2006-0137829; issued Aug. 10, 2009.

Office Action issued in corresponding Taiwan Patent Application No. 096123894, mailed Jun. 19, 2012.

* cited by examiner

ARRAY SUBSTRATE FOR LIQUID CRYSTAL DISPLAY DEVICE AND METHOD OF FABRICATING THE SAME

The present patent document is a divisional of U.S. patent application Ser. No. 11/824,041, filed Jun. 29, 2007 now U.S. Pat. No. 7,787,068, which claims priority to Korean Patent Application No. 2006-0137829 filed in Korea on Dec. 29, 2006, which are hereby incorporated by reference.

BACKGROUND

1. Field of the Invention

The present disclosure relates to an array substrate for a liquid crystal display (LCD) device, and more particularly, to an array substrate for an LCD device having a repair pattern.

2. Discussion of the Related Art

The conventional LCD devices use an optical anisotropic property and polarization properties of liquid crystal molecules to display images. The liquid crystal molecules have orientation characteristics of arrangement resulting from their long, thin shape. Thus, an arrangement direction of the liquid crystal molecules can be controlled by applying an electrical field to them. Accordingly, when the electric field is applied to them, polarization properties of light are changed according to the arrangement of the liquid crystal molecules such that the LCD devices display images.

The LCD device includes a first substrate, a second substrate, and a liquid crystal layer interposed therebetween. A common electrode and a pixel electrode are respectively formed on the first and second substrates. The first and second substrates may be referred to as a color substrate and an array substrate, respectively. The liquid crystal layer is driven by a vertical electric field induced between the common and pixel electrodes. LCD devices typically have excellent transmittance and aperture ratios.

Among the known types of LCD devices, active matrix LCD (AM-LCD) devices that have thin film transistors (TFTs) arranged in a matrix form are the subject of significant research and development because of their high resolution and superior ability in displaying moving images.

FIG. 1 is an exploded perspective view of a conventional liquid crystal panel of an LCD device. As shown in FIG. 1, the liquid crystal panel includes an array substrate 10, a color filter substrate 80, and a liquid crystal layer 70. The array substrate 10 and the color filter substrate 80 face each other. The liquid crystal layer 70 is interposed therebetween.

The array substrate 10 includes a first substrate 12, a gate line 13, a data line 30, a thin film transistor (TFT) Tr, and a pixel electrode 60. The gate and data lines 13 and 30 are formed on the first substrate 12 and cross each other to define a pixel region P. The TFT Tr is formed at a crossing portion of the gate and data lines 13 and 30. The pixel electrode 60 is formed in the pixel region P and connected to the TFT Tr.

The color filter substrate 80 includes a second substrate 82, a black matrix 85, a color filter layer 89, and a common electrode 92. The black matrix 85 is formed on the second substrate 82 and has a lattice shape. The black matrix 85 corresponds to a non-display region of the first substrate 12. The non-display region of the first substrate 12 also includes the gate and data lines 13 and 30 and the TFT Tr. The color filter layer 89 corresponds to the pixel region "P" and has one of red (R), green (G), and blue (B) colors 89a, 89b, and 89c. The common electrode 92 is formed on the black matrix 85 and the color filter layer 89. The common electrode 92 generates an electric field with the pixel electrode 60 such that the liquid crystal layer 70 is driven by the electric field.

Though not shown, first and second polarization plates may be formed on an outer surface of the first and second substrates 12 and 82. The first and second polarization plates respectively have first and second optical axes, and light parallel to each of the first and second optical axes can be passed through the first and second polarization plates, respectively. Moreover, a backlight assembly is formed on a rear side of the first substrate 12 to apply light into the liquid crystal panel.

FIG. 2 is a plane view showing an array substrate for an LCD device according to the related art. As shown in FIG. 2, a plurality of gate lines 13 and a plurality of data lines 30 are formed on a first substrate 12. The plurality of gate lines 13 and the plurality of data lines 30 cross each other such that a plurality of pixel regions P are defined. A gate pad (not shown) is formed at an end of each gate line 13. Each gate line 13 is connected to a gate driving circuit (not shown) via the gate pad. A data pad (not shown) is formed at an end of each data line 30. Each data line 30 is connected to a data driving circuit (not shown) via the data pad.

A thin film transistor (TFT) Tr is formed in each pixel region P. The TFT Tr is connected to the gate and data lines 13 and 30. A gate electrode 15, a semiconductor layer 23, a source electrode 33 and a drain electrode 36 constitute the TFT Tr. The gate electrode 15 is connected to the gate line 13, and the source electrode 33 is connected to the data line 30. The drain electrode 36 is spaced apart from the source electrode 33. A pixel electrode 60 is formed in each pixel region P. The pixel electrode 60 is connected to the drain electrode 36 through a drain contact hole 47. Moreover, a storage capacitor StgC is formed over the gate line 13. A storage pattern 15 overlaps the gate line 13 and is connected to the pixel electrode 60 through a storage contact hole 49. The overlapped portion of the gate line 13 functions as a first electrode, and the storage pattern 15 functions as a second electrode. An insulating layer (not shown) interposed between the overlapped portion of the gate line 13 and the storage pattern 15 functions as a dielectric material. The first electrode, the second electrode, and the insulating layer constitute the storage capacitor StgC.

The array substrate is fabricated through complicated processes such that defects may arise during the processes. Static electricity may be generated during the process. Moreover, the TFT may be deteriorate due to impurities such that the TFT does not have its desired functions. In this case, the defects may be repaired by disconnecting the pixel electrode 60 and the drain electrode 36 in the pixel region P. As a result, the LCD device displays only white color in a normally white mode and black color in a normally black mode in the pixel region P having the pixel electrode 60 disconnected from the drain electrode 36. In the normally white mode, white color is displayed in the pixel region P in which a signal is not applied. In contrast, in the normally black mode, black color is displayed in the pixel region in which a signal is not applied.

The LCD device may have tens of thousands to tens of millions of the pixel regions P depending on size or resolution of the liquid crystal panel. If the LCD devices are considered acceptable for sale only when all pixel regions P function well, production yield becomes too low. Accordingly, although some pixel regions P do not display desired images, the LCD devices are treated as acceptable for sale and considered to be without defect. A method of repairing by disconnecting the pixel electrode 60 from the drain electrode 36 in some pixel regions P may not affect quality of the displaying images.

However, there are some problems. When the LCD device has the normally black mode and displays bright images, the repaired pixel region P in which black color is normally displayed may be conspicuous. In contrast, when the LCD device has the normally white mode and displays dark images, the repaired pixel region in which white color is normally displayed may be conspicuous.

BRIEF SUMMARY

Accordingly, the present disclosure is directed to an array substrate, and method of fabrication, for an in-plane switching mode liquid crystal device (IPS-LCD) that provides one or more advantages over the related art when repairing an LCD device in which the desired image of one or more of pixel regions P is not displayed.

In a first aspect, an array substrate for a liquid crystal display device includes: first and second gate lines on a substrate; a data line crossing the first and second gate lines to define first and second pixel regions, respectively; a first thin film transistor connected to the first gate line and the data line; first and second pixel electrodes in the first and second pixel regions, respectively, the first pixel electrode connected to the first thin film transistor; and a first repair pattern crossing over the first gate line, the first repair pattern electrically connected to one of the first thin film transistor and the second pixel electrode.

In a second aspect, an array substrate for a liquid crystal display (LCD) device includes: first and second gate lines crossing a data line on a substrate to define first and second pixel regions; a thin film transistor (TFT) including a source electrode that extends from the data line, a drain electrode spaced apart from the source electrode, a semiconductor layer on an insulating layer positioned between the gate electrode and the source and drain electrodes; a metal pattern on the semiconductor layer that overlaps a common line and makes up a portion of the drain electrode; a passivation layer disposed on the source and drain electrodes and on the metal pattern; a first pixel electrode on the passivation layer and connected to the metal pattern; a common electrode on the passivation layer and connected to the common line; and a repair pattern on the semiconductor layer connected to the drain electrode at one end thereof and overlapping under a second pixel electrode of the second pixel region at another end thereof to define a repairing portion.

In a third aspect, an array substrate for a liquid crystal display (LCD) device includes: first and second gate lines crossing a data line on a substrate to define first and second pixel regions; a thin film transistor (TFT) including a source electrode that extends from the data line, a drain electrode spaced apart from the source electrode, a semiconductor layer on an insulating layer positioned between the gate electrode and the source and drain electrodes; a first metal pattern on the semiconductor layer that extends from the drain electrode and overlaps a common line; a second metal pattern that extends from the first metal pattern towards the second pixel region; a passivation layer disposed on the source and drain electrodes and on the first and second metal patterns; a common electrode on the passivation layer and connected to the common line; a first pixel electrode on the passivation layer and connected to the first metal pattern; and a repair pattern on the passivation layer that extends from a second pixel electrode of the second pixel region at one end thereof and overlaps the second metal pattern at another end thereof to define a repairing portion.

In a fourth aspect, an array substrate for a liquid crystal display (LCD) device includes: first and second gate lines crossing a data line on a substrate to define first and second pixel regions; a thin film transistor (TFT) including a source electrode that extends from the data line, a drain electrode spaced apart from the source electrode, a semiconductor layer on an insulating layer positioned between the gate electrode and the source and drain electrodes; a metal pattern on the semiconductor layer that overlaps a common line and makes up a portion of the drain electrode; a passivation layer disposed on the source and drain electrodes and on the metal pattern; a common electrode on the passivation layer and connected to the common line; a first pixel electrode on the passivation layer and connected to the metal pattern, wherein the first pixel electrode includes a protrusion that extends towards the second pixel region; a first repair pattern on the passivation layer that extends from a second pixel electrode of the second pixel region; and a second repair pattern on the semiconductor layer that overlaps under the protrusion at one end thereof to define a first repairing portion and overlaps under the first repair pattern at the other end thereof to define a second repairing portion.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure, and are incorporated in and constitute a part of this specification, illustrate embodiments of the disclosure and together with the description serve to explain the principles thereof.

DETAILED DESCRIPTION OF THE DRAWINGS AND THE PRESENTLY PREFERRED EMBODIMENTS

An array substrate for an LCD device has a repair pattern. When defects are generated in a pixel region, a pixel electrode in the pixel region can be electrically connected to another pixel electrode in another pixel region by the repair pattern. Although the disclosure teaches with respect to an array substrate for an in-plane switching mode liquid crystal device (IPS-LCD) where a pixel electrode and a common electrode are formed in the same substrate so as to have a wide viewing angle, the present disclosure can be equally applied to an array substrate for a twisted nematic (TN) mode LCD device (TN-LCD).

Figure 1:
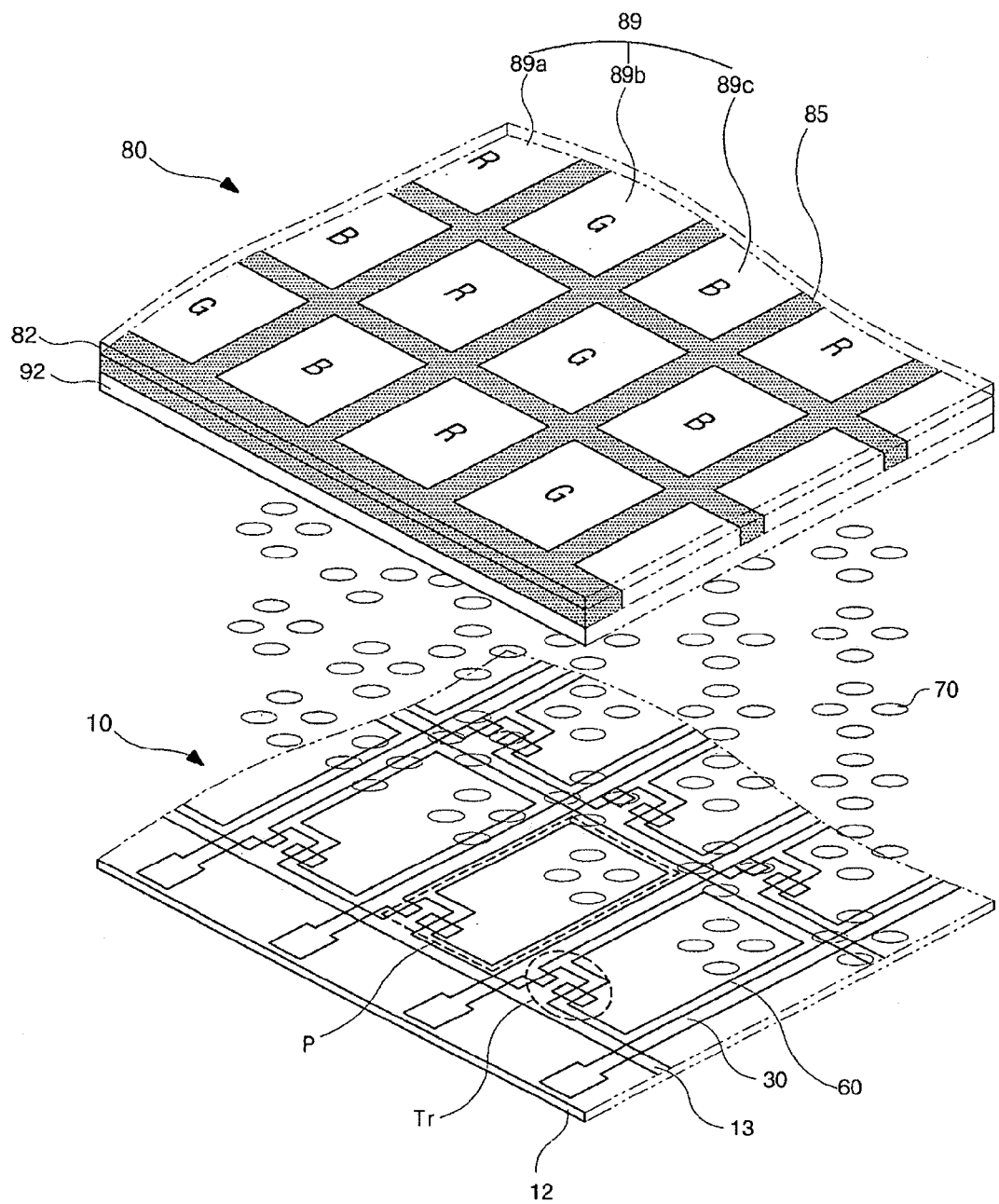
FIG. 1 is an exploded perspective view of a conventional liquid crystal panel of an LCD device.
Figure 2:
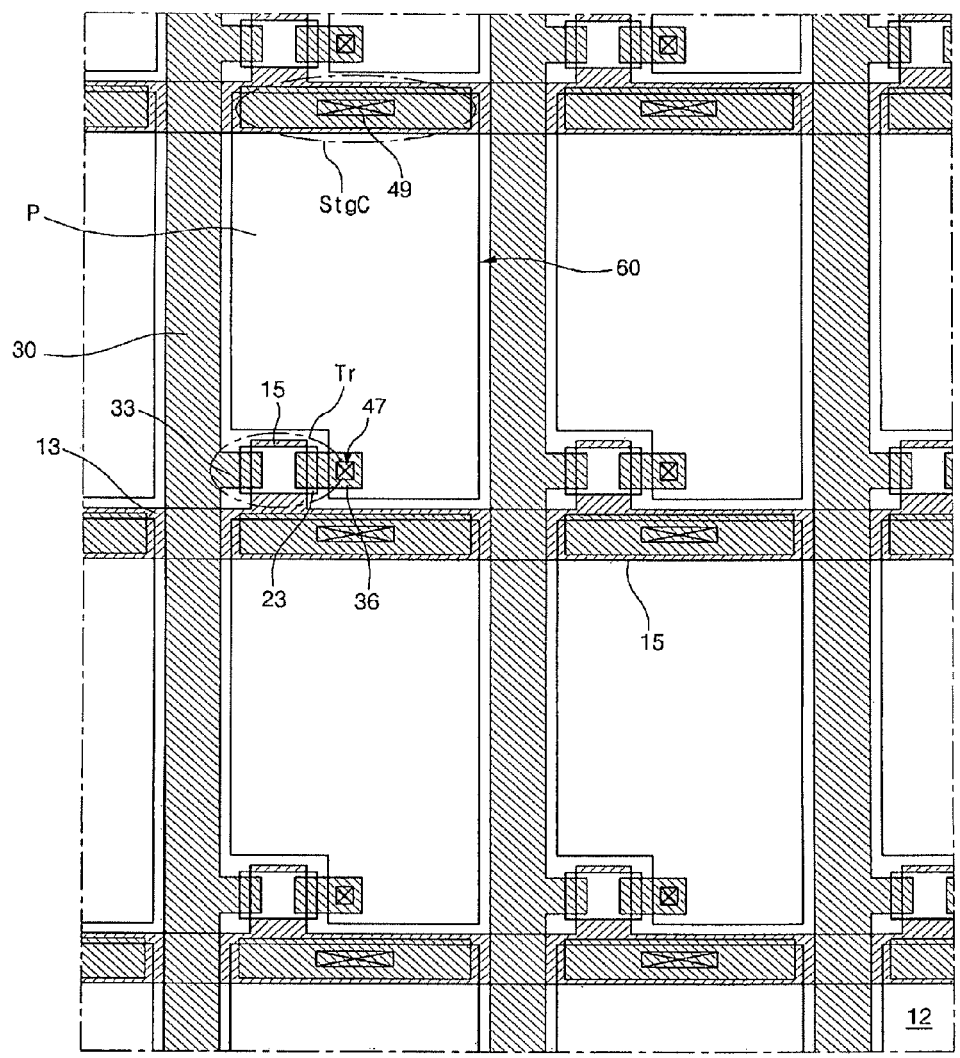
FIG. 2 is a plane view showing an array substrate for an LCD device according to the related art.
Figure 3:
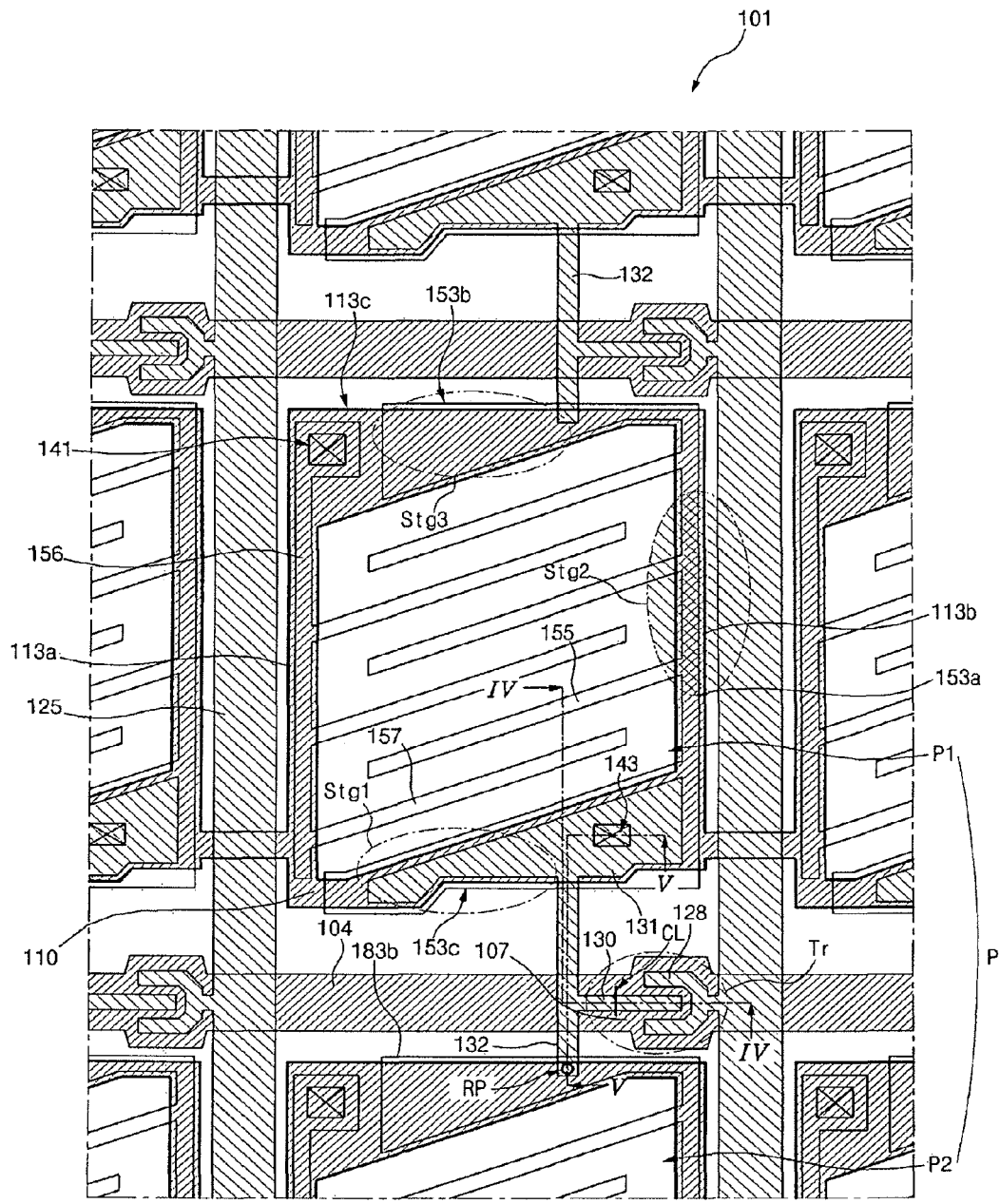
FIG. 3 is a plane view showing an array substrate for an in-plane switching mode liquid crystal device (IPS-LCD) according to a first embodiment of the present disclosure.
Figure 4:
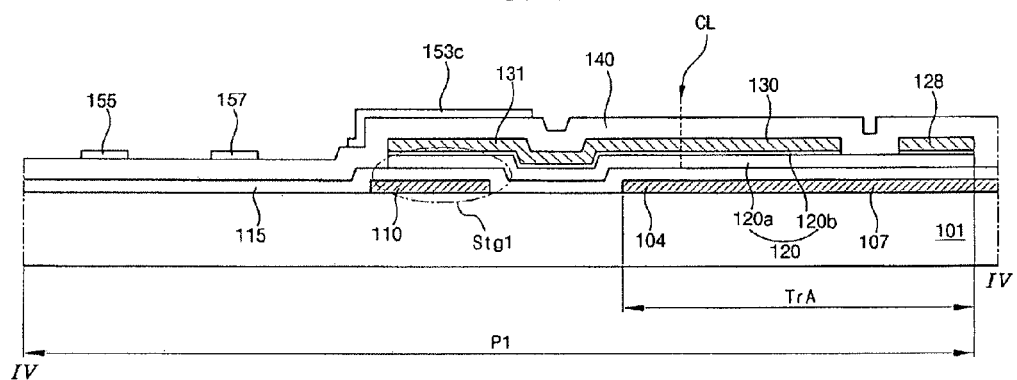
FIG. 4 is a cross-sectional view taken along the line IV-IV of FIG. 3.
Figure 5:
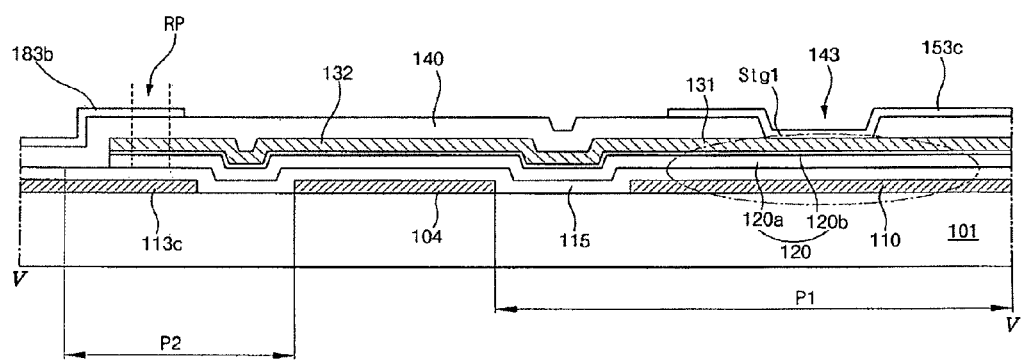
FIG. 5 is a cross-sectional view taken along the line V-V of FIG. 3.

FIG. 3 is a plane view showing an array substrate 101 for an IPS-LCD device according to a first embodiment of the present disclosure. FIG. 4 is a cross-sectional view taken along the line IV-IV of FIG. 3. FIG. 5 is a cross-sectional view taken along the line V-V of FIG. 3. FIGS. 3 through 5 will jointly be referred to for the following discussion.

A plurality of pixel regions P are defined in the substrate 101. Because each of the plurality of pixel regions P has the same structure, two adjacent pixel regions will be illustrated for discussion. The array substrate 101 includes a first gate line 104 and a data line 125 formed thereon. Although not shown in FIG. 3, a second gate line is formed on the substrate 101 to be parallel to and spaced apart from the first gate line 104. The first gate line 104 and the second gate line cross the data line 125 to define first and second pixel regions P1 and P2, respectively. The first and second pixel regions P1 and P2, which have the same structure, constitute a plurality of pixel regions P of the substrate 101. A common line 110, which is substantially parallel to and spaced apart from the first gate line 104, is formed on the substrate 101.

First and second common electrode connecting patterns 113a and 113b respectively extend from both ends of the common line 110 and are formed in the first pixel region P1. The first and second common electrode connecting patterns 113a and 113b are parallel to the data line 125. Moreover, a third common electrode connecting pattern 113c joins the first and second common electrode connecting patterns 113a and 113b and is formed in the pixel region P. Namely, one end of each of the first and second common electrode connecting patterns 113a and 113b is connected to the common line 110, and the other end of each of the first and second common electrode connecting patterns 113a and 113b are connected to the third common electrode connecting pattern 113c. As a result, the common line 110 and the first to third common electrode connecting patterns 113a to 113c form a square or rectangular shape in the first pixel region P1.

The common line 110 and the third common electrode connecting pattern 113c have both wider and narrower portions in FIG. 3. The common line 110 and the third common electrode connecting pattern 113c, however, may have other shapes. The wider portion of the common line 110 is connected to the second common electrode connecting pattern 113b, and the narrower portion of the common line 110 is connected to the first common electrode connecting pattern 113a. In contrast, the wider portion of the third common electrode connecting pattern 113c is connected to the first common electrode connecting pattern 113a, and the narrower portion of the third common electrode connecting pattern 113c is connected to the second common electrode connecting pattern 113b.

A source electrode 128 extends from the data line 125 and a drain electrode 130 is spaced apart from the source electrode 128, and overlaps the first gate line 104. The overlapped portion of the first gate line 104 with the source and drain electrodes 128 and 130 is defined as a gate electrode 107. A gate insulating layer 115 is formed on the gate electrode 107, and a semiconductor layer 120 is formed on the gate insulating layer 115. The source and drain electrodes 128 and 130 are formed on the semiconductor layer 120. The drain electrode 130 may be parallel to the first gate line 104. The source electrode 128 may have a "U" shape, and the drain electrode 130 is disposed in the "U" shape. The gate electrode 107, the gate insulating layer 115, the semiconductor layer 120, the source electrode 128, and the drain electrode 130 constitute a first thin film transistor (TFT) Tr. The first TFT Tr is connected to the first gate line 104 and the data line 125. Although not shown in FIGS. 3 through 5, a second TFT in the second pixel region P is connected to the second gate line and the data line 125.

A first pixel electrode including first, second, and third pixel patterns 153a, 153b and 153c and a plurality of fourth pixel patterns 155 is formed in the first pixel region P1. The first, second and third pixel patterns 153a, 153b and 153c and the plurality of fourth pixel patterns 155 are electrically connected to the first TFT Tr. The first pixel pattern 153a combines one end of the plurality of fourth pixel patterns 155. The second and third pixel patterns 153b and 153c extend from respective ends of the first pixel pattern 153a. The second and third pixel patterns 153b and 153c have wider and narrower portions in FIG. 3. However, the second and third pixel patterns 153b and 153c may have other shapes. The narrower portion of the second pixel pattern 153b is adjacent to the first pixel pattern 153a than the wider portion of the second pixel patterns 153b. In contrast, the wider portion of the third pixel pattern 153c is adjacent to the first pixel pattern 153a than the narrower portion of the third pixel patterns 153c. Namely, the second and third pixel patterns 153b and 153c have substantially the same shape as the third common electrode connecting pattern 113c and the common line 110, respectively. The plurality of fourth pixel patterns 155, the second pixel pattern 153b and the third pixel pattern 153c are substantially parallel to each other and form an angle with respect to the first pixel pattern 153a.

The plurality of fourth pixel patterns 155 are spaced apart from each other. The plurality of fourth pixel patterns 155 may include a transparent conductive material, such as indium-tin-oxide (ITO) and indium-zinc-oxide (IZO).

The third pixel pattern 153c is connected to a metal pattern 131, which makes up a portion of the drain electrode 130, through a drain contact hole 143. The metal pattern 131 extends from the drain electrode 130 of the TFT Tr. Signals are applied to the plurality of fourth pixel patterns 155 via the drain electrode 130, the metal pattern 131, the third pixel pattern 153c and the first pixel pattern 153a.

The metal pattern 131 overlaps the common line 110. The overlapped portion of the common line 110, the metal pattern 131 connected to the third pixel pattern 153c, and a gate insulating layer 115 interposed therebetween constitute a first storage capacitor Stg1. The second common electrode connecting pattern 113b overlaps the first pixel pattern 153a. The overlapped portion of the second common electrode connecting pattern 113b, the overlapped portion of the first pixel pattern 153a, and the intervening gate insulating layer 115 and an intervening passivation layer 140 interposed therebetween, constitute a second storage capacitor Stg2. Moreover, the third common electrode connecting pattern 113c overlaps the second pixel pattern 153b. The overlapped portion of the third common electrode connecting pattern 113c, the overlapped portion of the second pixel pattern 153b, and the intervening gate insulating and passivation layers 115, 140 interposed therebetween, constitute a third storage capacitor Stg3.

A common electrode, including a first common pattern 156 and a plurality of second common patterns 157, is formed in the first pixel region P1. The first common pattern 156 overlaps the first common electrode connecting pattern 113a. The first common pattern 156 is connected to the first common electrode connecting pattern 113a through a common contact hole 141 and includes a transparent conductive material, such as ITO and IZO. The plurality of second common patterns 157 extend from the first common pattern 156 and are spaced apart form each other. The plurality of second common patterns 157 are alternately arranged with and parallel to the plurality of fourth pixel patterns 155. The plurality of second common patterns 157 and the plurality of fourth pixel patterns 155 may be formed of the same layer and the same transparent conductive material. The plurality of second common patterns 157 and the plurality of fourth pixel patterns 155 are formed at angles with respect to the first gate line 104 in FIG. 3. However, the plurality of second common patterns 157 and the plurality of fourth pixel patterns 155 may be parallel to the first gate line 104 in another embodiment. Alternately, the plurality of second common patterns 157 and the plurality of fourth pixel patterns 155 may be classified into two groups having varying angles to form two domains in the first pixel region P1. A viewing angle is improved by a multiple-domain structure.

Moreover, a repair pattern 132 is formed on the substrate 101. The plurality of pixel regions includes the first pixel region P1 and the second pixel region P2 vertically adjacent to each other. The repair pattern 132 crosses over the first gate line 104 and electrically connects to the drain electrode 130 of the first TFT Tr. Accordingly, the repair pattern 132 extends from the drain electrode 130 in the first pixel region P1 to a second pixel pattern 183b of a second pixel electrode in the second pixel region P2 to overlap the second pixel pattern 183b in the second pixel region P2. The repair pattern 132 may be formed of the same layer and the same material as the drain electrode 130. Because the passivation layer 140 is formed between the repair pattern 132 and the second pixel pattern 183b of the second pixel electrode in the second pixel region P2, the repair pattern 132 and the second pixel pattern 183b of the second pixel electrode are electrically disconnected from each other before repairing. The overlapped portion of the repair pattern 132 and the second pixel pattern 183b of the second pixel electrode in the second pixel region P2 is defined as a repairing portion RP.

When the first TFT Tr in the first pixel region P1 does not function due to impurities, the drain electrode 130 is cut along a cutting line CL such that the first pixel electrode, including the first, second, and third pixel patterns 153a, 153b and 153c and the plurality of fourth pixel patterns 155, is disconnected from the first TFT Tr in the first pixel region P1. Next, the repair pattern 132 is connected to the second pixel pattern 183b of the second pixel electrode in the second pixel region P2 by a repairing method. For example, laser beam may be irradiated into a repairing portion RP to connect the repair pattern 132 and the second pixel pattern 183b of the second pixel electrode in the second pixel region P2.

As a result, the first pixel electrode in the first pixel region P1 is electrically connected to the second TFT (not shown) in the second pixel region P2 through the second pixel electrode in the second pixel region P2, the repair pattern 132 and the drain electrode 130 in the first pixel region P1. Signals applied to the second pixel electrode in the second pixel region P2 can be applied to the first pixel electrode in the first pixel region P1 such that images displayed in the first pixel region P1 has the same gray level as images displayed in the second pixel region P2. Accordingly, the above-mentioned problems in the related art can be overcome.

With further reference to FIGS. 4 and 5, a region where the first TFT Tr is formed is defined as a switching region TrA. The first gate line 104 is formed on the substrate 101; the gate electrode 107 is connected to the first gate line 104 as formed in the switching region TrA of the first pixel region P1. The common line 110 is spaced apart from the first gate line 104 and is formed in the first pixel region P1 on the substrate 101. FIG. 5 shows the third common electrode connecting pattern 113c formed in the second pixel region P2. In the second pixel region P2, the third common electrode connecting pattern 113c is connected to the common line through the first and second common electrode connecting patterns (structures not shown). The first and second common electrode connecting patterns may be formed of the same layer and the same material as the third common electrode connecting pattern 113c in the second pixel region P2.

The gate insulating layer 115 is formed on the substrate 101 including the first gate line 104, the gate electrode 107, the common line 110, and the third common electrode connecting patterns 113c of the second pixel region P2. The gate insulating layer 115 may include an inorganic insulating material. The semiconductor layer 120, including an active layer 120a of intrinsic amorphous silicon and an ohmic contact layer 120b of impurity-doped amorphous silicon, is formed on the gate insulating layer 115. The ohmic contact layer 120b is formed on the active layer 120a. The source and drain electrodes 128 and 130 are formed on the semiconductor layer 120 in a spaced-apart relationship. Moreover, the repair pattern 132 is formed on the gate insulating layer 115. The repair pattern 132 crosses over the first gate line 104 and is electrically connected to the drain electrode 130. Accordingly, the repair pattern 132 extends from the drain electrode 130 in the first pixel region P1 to the second pixel region P2. The repair pattern 132 may be formed of the same layer and the same material as the drain electrode 130. The data line 125 (of FIG. 3) crosses the first gate line 104 and the second gate line (not shown) such that the first and second pixel regions P1 and P2 are defined. The data line 125 (of FIG. 3) is connected to the source electrode 128.

The metal pattern 131 extending from the drain electrode 130 is formed on the gate insulating layer 115 and overlaps the common line 110. As mentioned above, the overlapped portion of the common line 110 as a first electrode, the metal pattern 131 as a second electrode, and the gate insulating layer 115 therebetween as a dielectric material, constitute the first storage capacitor Stg1.

The semiconductor layer 120 is disposed under and has substantially the same shape as the data line 125 (of FIG. 3), the repair pattern 132, and the metal pattern 131. This is because the semiconductor layer 120, the data line 125 (of FIG. 3), the repair pattern 132, and the metal pattern 131 are patterned at the same time using a single mask process. If the semiconductor layer 120 is patterned by a different mask process than that of the data line 125, then the repair pattern 132, the metal pattern 131, and the semiconductor layer 120 would not lie under the data line 125, the repair pattern 132, and the metal pattern 131.

The passivation layer 140 is formed on the source electrode 128, the drain electrode 130, the repair pattern 132, and the metal pattern 131. The passivation layer 140 is patterned to form the drain contact hole 143 and the common contact hole 141 (of FIG. 3). The drain contact hole 143 and the common contact hole 141 respectively expose the metal pattern 131 and the first common electrode connecting pattern 113a (of FIG. 3).

The second pixel pattern 153b, the third pixel pattern 153c, the plurality of fourth pixel patterns 155, and the plurality of second common patterns 157 are formed of a transparent conductive material on the passivation layer 140. Moreover, the first pixel pattern 153a (of FIG. 3) and the first common pattern 156 (of FIG. 3) are formed on the passivation layer 140.

The first pixel pattern 153a overlaps the second common electrode connecting pattern 113b, and the second and third pixel patterns 153b and 153c extend from respective ends of the first pixel pattern 153a. The second and third pixel patterns 153b and 153c overlap the third common electrode connecting pattern 113c and the common line 110, respectively. Moreover, the second pixel pattern 183b of the second pixel electrode in the second pixel region P2 overlaps the repair pattern 132 extending from the drain electrode 130 in the first pixel region P1. The plurality of fourth pixel patterns 155 extend from the first pixel pattern 153a. The second pixel pattern 153b and the third pixel pattern 153c, and the plurality of fourth pixel patterns 155 are substantially parallel to the each other and angled toward the first pixel pattern 153a. The third pixel pattern 153c is connected to the metal pattern 131 through the drain contact hole 143.

The first common pattern 156 (of FIG. 3) is connected to the first common connecting pattern 113a through the common contact hole 141 and also overlaps the first common connecting pattern 113a. The plurality of second common patterns 157 extend from and are angled toward the first common pattern 156. The plurality of second common patterns 157 are alternately arranged with, and parallel to, the plurality of fourth pixel patterns 155.

When the first TFT Tr in the first pixel region P1 does not function, the plurality of fourth pixel patterns 155 in the first pixel region P1 are electrically disconnected from the first TFT Tr in the first pixel region P1 and are electrically connected to the second TFT in the second pixel region P2 by repairing. Namely, the drain electrode 130 of the first TFT Tr in the first pixel region P1 is cut along the cutting line CL, and a laser beam may be irradiated into the repairing portion RP such that the repair pattern 132 is connected to the second pixel pattern 183b of the second pixel electrode in the second pixel region P2. As a result, the first pixel electrode in the first pixel region P1 receives the same signals as the second pixel electrode in the second pixel electrode P2.

Figure 6:
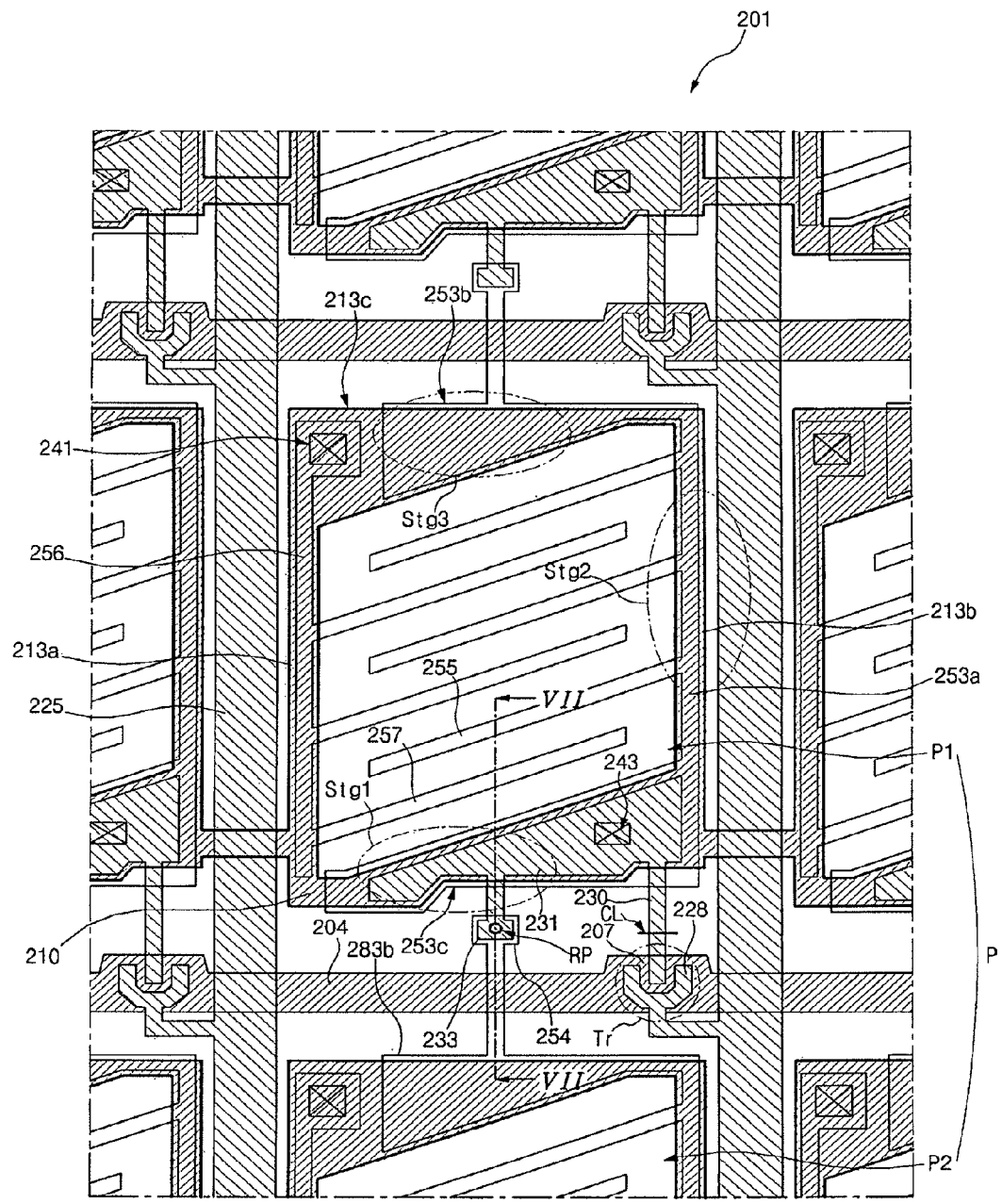
FIG. 6 is a plane view showing an array substrate for an IPS-LCD device according to a second embodiment of the present disclosure.

FIG. 6 is a plane view showing an array substrate for an IPS-LCD device according to a second embodiment of the present disclosure. In the second embodiment, the drain electrode is parallel to the data line. Similar elements as the elements explained in FIGS. 3 to 5 are not explained.

As shown in FIG. 6, the first gate line 204 and the second gate line (not shown) cross the data line 225 to define the first and second pixel regions P1 and P2, respectively. The source electrode 228 extends from the data line 225 and has a "U" shape. The drain electrode 230 in the first pixel region P1 is parallel to the data line 225 and disposed within the "U" shape source electrode 228. The source and drain electrodes 228 and 230 overlap the gate line 204. The overlapped portion of the gate line 204 is defined as the gate electrode 207. A first metal pattern 231 in the first pixel region P1 extends from the drain electrode 230, and a second metal pattern 233 extends from the first metal pattern 231 to be parallel to the drain electrode 230. The first and second metal patterns 231 and 233 make up portions of the drain electrode 230 of the first TFT Tr. A repair pattern 254 is formed on a passivation layer (not shown). A repair pattern 254 may cross over the first gate line 204 and is electrically connected to a second pixel pattern 283b of a second pixel electrode in the second pixel region P2. One of skill in the art will appreciate that the repair pattern 254 may stop short of crossing the first gate line 204, and that the second metal pattern 233 may extend to cross over the first gate line 204 to overlap with the repair pattern 254.

In sum, the repair pattern 254 extends from the second pixel pattern 283b in the second pixel region P2 to the first pixel region P1 and overlaps the second metal pattern 233 that makes up a portion of the drain electrode 230 in the first pixel region P1. The repairing portion RP is disposed in the overlapped portion of the repair pattern 254 and the second metal pattern 233.

Figure 7:
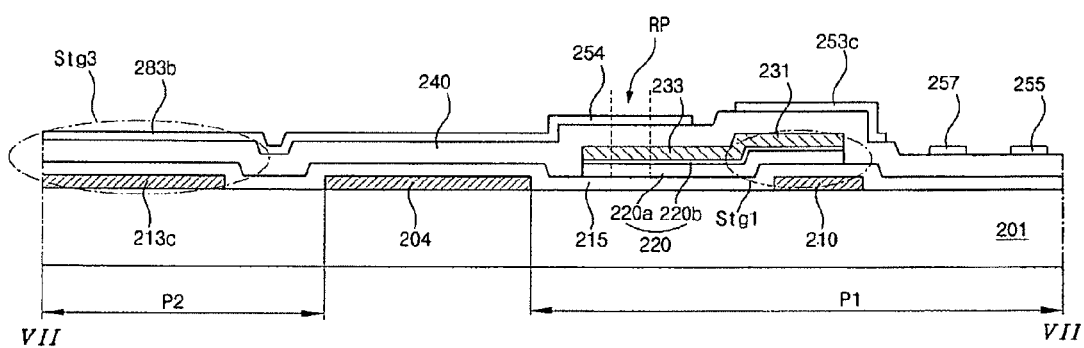
FIG. 7 is a cross-sectional view taken along the line VII-VII of FIG. 6.

FIG. 7 is a cross-sectional view taken along the line VII-VII of FIG. 6. As shown in FIG. 7, the first gate line 204, a common line 210 and a third common electrode connecting pattern 213c are formed on the substrate 201. A gate insulating layer 215 is formed on the first gate line 204, the common line 210, and the third common electrode connecting pattern 213c. A semiconductor layer 220, including an active layer 220a and an ohmic contact layer 220b, is formed on the gate insulating layer 215. The first metal pattern 231 extending from the drain electrode 230 (of FIG. 6) is disposed on the semiconductor layer 220 and overlaps the common line 210. The overlapped portion of the common line 210, the first metal pattern 231, and the gate insulating layer 215 therebetween constitute the first storage capacitor Stg1. The second metal pattern 233 that extends from the first metal pattern 231 is formed on the gate insulating layer 215. A passivation layer 240 is formed on the first and second metal patterns 231 and 233. A plurality of fourth pixel patterns 255, a plurality of second common patterns 257, the second pixel pattern 283b of the second electrode, and the repair pattern 254 are formed on the passivation layer 240.

In FIG. 7, the plurality of fourth pixel patterns 255 and the plurality of second common patterns 257 are formed in the first pixel region P1. In the second pixel region P2, the second pixel pattern 283b of the second pixel electrode overlaps the third common electrode connecting pattern 213c in the second pixel region P2. The overlapped third common electrode connecting pattern 213c, the second pixel pattern 283b of the second pixel electrode, and the gate insulating and passivation layers 215 and 240 interposed therebetween, constitute the third storage capacitor Stg3. The repair pattern 254 extends from the second pixel pattern 283b of the second pixel electrode in the second pixel region P2 into the first pixel region P1 to overlap the second metal pattern 233 that makes up a portion of the drain electrode 230. Because the passivation layer 240 is interposed between the repair pattern 254 and the second metal pattern 233, the repair pattern 254 and the second metal pattern 233 are not electrically connected to each other before repairing.

When the first TFT Tr in the first pixel region P1 does not function, the drain electrode 230 in the first pixel region P1 is cut along the cutting line CL to disconnect the first pixel electrode in the first pixel region P1 from the first TFT Tr in the first pixel region P1. And then, the repair pattern 254 and the second metal pattern 233 are connected by irradiating a laser beam into the repairing portion RP to connect the first pixel electrode in the first pixel region P1 to the second pixel electrode in the second pixel region P2. Pixel regions P1 and P2 are connected through connecting together the second pixel pattern 283b in the second pixel region P2, the repair pattern 254, and the drain electrode 230 in the first pixel region P1. As a result, signals applied to the second pixel electrodes in the second pixel region P2 are applied to the first pixel electrode in the first pixel region P1. And images displayed in the first pixel region P1 have the same gray level as the images displayed in the second pixel region P2.

Figure 8:
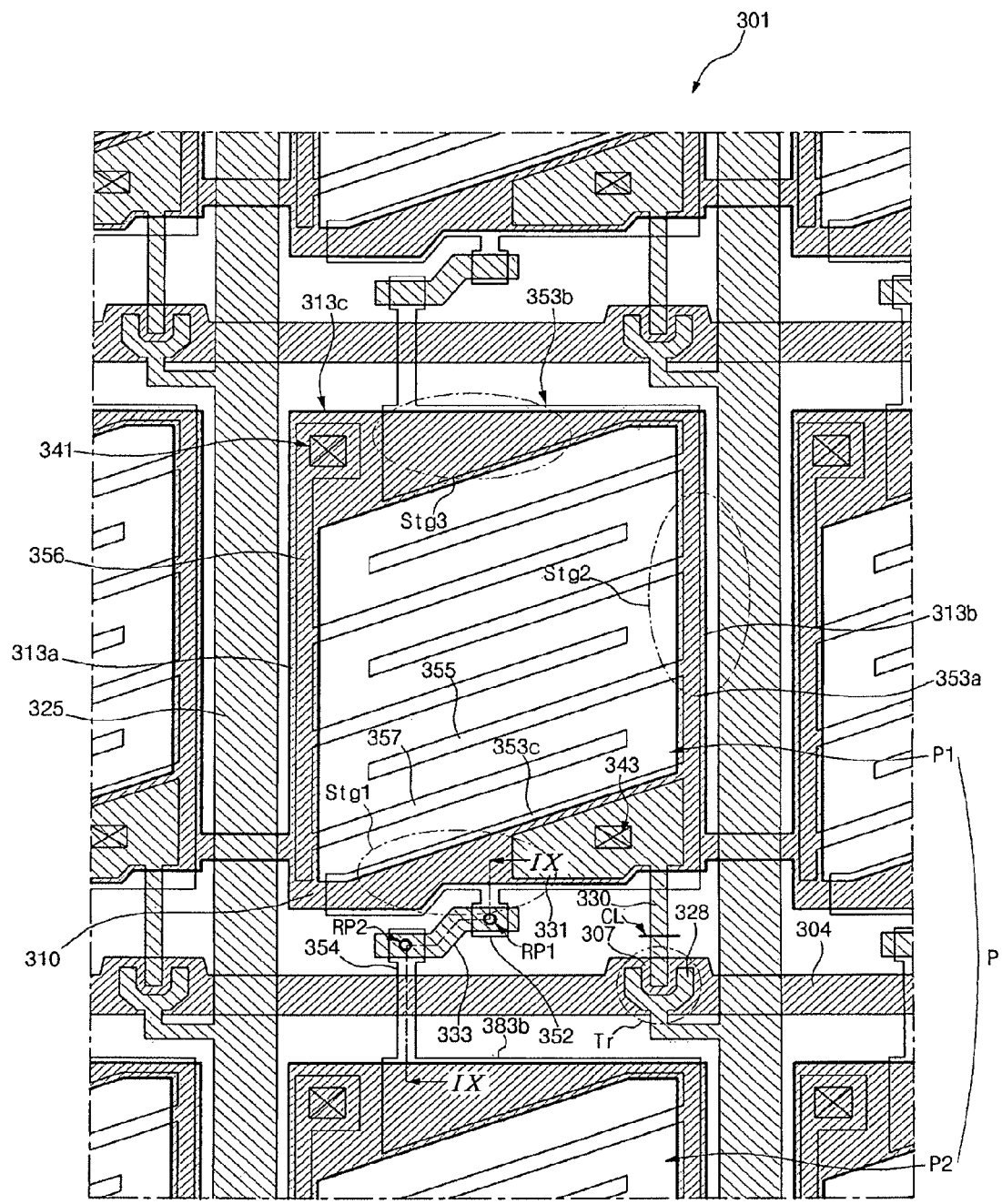
FIG. 8 is a plane view showing an array substrate for an IPS-LCD device according to a third embodiment of the present disclosure.
Figure 9:
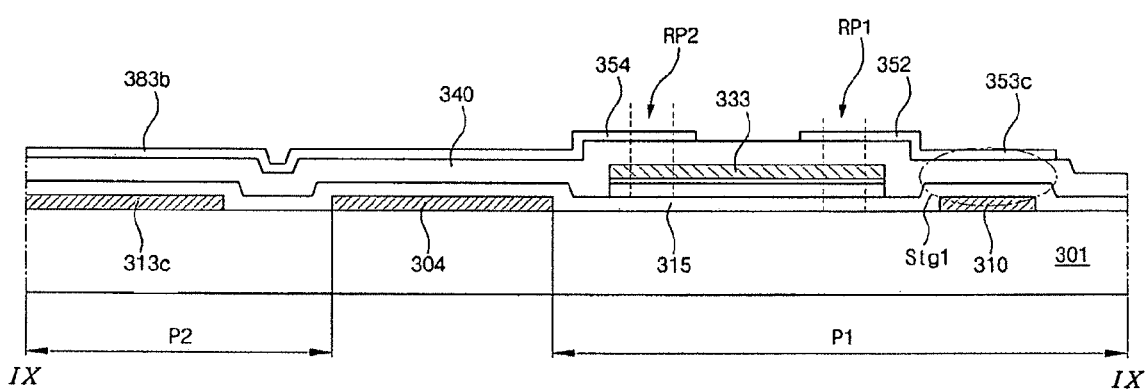
FIG. 9 is a cross-sectional view taken along the line IX-IX of FIG. 8.

FIG. 8 is a plane view showing an array substrate for an IPS-LCD device according to a third embodiment of the present disclosure, and FIG. 9 is a cross-sectional view taken along the line IX-IX of FIG. 8. Elements in the third embodiment except for a repair pattern are substantially the same as those in the second embodiment such that the same elements are not explained.

Over a substrate 301, a first gate line 304 and the second gate line (not shown) crosses a data line 325 to define first and second pixel regions P1 and P2, respectively. A common line 310 is spaced apart from the first gate line 304. A source electrode 328 extends from the data line 325 and may have a "U" shape. A drain electrode 330 is disposed within the "U" shape source electrode 328, yet spaced apart from the source electrode 328. The drain electrode 330 is substantially parallel to a data line 325.

A metal pattern 331, which makes up a portion of the drain electrode 330, extends from the drain electrode 330 and overlaps a common line 310. First and second repair patterns 354 and 333 are formed over the substrate 301. The first pixel electrode in the first pixel region P1 includes a protruding portion 352. The protruding portion 352 extends from a third pixel pattern 353c in the first pixel region P1 and overlaps one end of the second repair pattern 333. The first repair pattern 354 crosses over the first gate line 304 and electrically connects to a second pixel pattern 383b of a second pixel electrode in the second pixel region P2. Accordingly, the first repair pattern 354 extends from the second pixel pattern 383b of the second pixel electrode in the second pixel region P2 to the first pixel region P1 and overlaps the other end of the second repair pattern 333.

The second repair pattern 333 may be disposed between the first gate line 304 and the common line 310 in the first pixel region P1. One of skill in the art will appreciate that the second repair pattern 33 may be disposed between the second pixel pattern 383b and the first gate line 304, wherein the first repair pattern 354 does not cross the first gate line 304. The second repair pattern 333 is formed of the same layer and the same material as the drain electrode 330 and the metal pattern 331. However, the second repair pattern 333 is separated from the drain electrode 330 and the metal pattern 331 and has an island shape.

The second repair pattern 333 is formed on a gate insulating layer 315 and disposed between the first gate line 304 and the common line 310. A passivation layer 340 is formed on the second repair pattern 333. The protruding portion 352 is formed on the passivation layer 340 and extends from the third pixel pattern 353c in the first pixel region P1 to overlap one end of the second repair pattern 333. The first repair pattern 354 is formed on the passivation layer 340 and extends from the second pixel pattern 383b of the second pixel electrode in the second pixel region P2 to overlap the other end of the second repair pattern 333. The overlapped portion of the protruding portion 352 and the second repair pattern 333 is defined as a first repairing portion RP1, and the overlapped portion of the first repair pattern 354 and the second repair pattern 333 is defined as a second repairing portion RP2. Since the passivation layer 340 is interposed between the second repair pattern 333 and the protruding portion 352 and between the second repair pattern 333 and the first repair pattern 354, the protruding portion 352 of the first pixel electrode and the first repair pattern 354 are electrically disconnected from the second repair pattern 333.

When the first TFT Tr in the first pixel region P1 does not function, the drain electrode 330 in the first pixel region P1 is cut along the cutting line CL to disconnect the first pixel electrode in the first pixel region P1 from the first TFT Tr in the first pixel region P1. And then, the protruding portion 352 of the first pixel electrode in the first pixel region P1 and the second repair pattern 333 are electrically connected by irradiating a laser beam into the first repairing portion RP1, and the first and second repair patterns 354 and 333 are electrically connected by irradiating a laser beam into the second repairing portion RP2. Accordingly, the protruding portion 352 of the first pixel electrode in the first pixel region P1 and the first repair pattern 354 are electrically connected to each other via the second repair pattern 333. As a result, the second pixel electrode in the first pixel region P1 is connected to the second pixel electrode in the second pixel region P2 through the first repair pattern 354, the second repair pattern 333, and the protruding portion 352. Accordingly, the first pixel electrode in the first pixel region P1 begins to receive the same signals as the second pixel electrode in the second pixel region P2 after repair.

A method of fabricating an array substrate for an IPS-LCD device according to the first embodiment is briefly explained. First, a first metallic material layer is formed on the substrate. Then, the first metallic material layer is patterned using a mask process to form the first and second gate lines, the gate electrode, the common line and the first to third common electrode connecting patterns. The mask process includes a step of forming a photoresist (PR) layer, a step of exposing the PR layer using a mask, a step of developing the PR layer to form PR patterns, and a step of removing the first metallic layer exposed between the PR patterns. As mentioned above, the common line is spaced apart from the first gate line. The first and second common electrode connecting patterns extend from respective ends of the common line. The third common electrode connecting pattern combines the first and second common electrode connecting patterns. Namely, the common line and the first to third common electrode connecting patterns form a square or rectangular shape.

Next, the gate insulating layer is formed on the first and second gate lines, the gate electrode, the common line and the first to third common electrode connecting patterns by depositing an inorganic insulating material, such as silicon oxide and silicon nitride.

Next, an amorphous silicon layer, an impurity-doped amorphous silicon layer and a second metallic material layer are sequentially formed on the gate insulating layer. The amorphous silicon layer, the impurity-doped amorphous silicon layer and the second metallic material layer may be patterned using one of a diffractive mask process or a half-tone mask process to form the data line, the source electrode, the drain electrode, the active layer and the ohmic contact layer. The data line crosses the first and second gate lines to define the first and second pixel regions. The source electrode extends from the data line and is spaced apart from the drain electrode. The source and drain electrodes overlap the gate electrode. The drain electrode is parallel to the first gate line. The semiconductor layer, including the active layer and the ohmic contact layer, is disposed under the source electrode, the drain electrode, and the data line.

At the same time, the repair pattern crosses the first gate line and is electrically connected to the drain electrode of the first thin film transistor. The repair pattern extends from the drain electrode in the first pixel region into the second pixel region to overlap the third common electrode connecting pattern of the second pixel electrode. Moreover, the metal pattern that makes up a portion of the drain electrode extends from the drain electrode in the first pixel region and overlaps the common line. The repair pattern and the metal pattern may oppositely extend.

Next, the passivation layer is formed on the data line, the source and drain electrodes, the repair pattern and the metal pattern. The passivation layer is patterned to form the drain contact hole and the common contact hole. The drain contact hole and the common contact hole respectively expose the metal pattern and the first common electrode connecting pattern.

Next, a transparent conductive material layer is formed on the passivation layer. The transparent conductive material layer is patterned to form the first to third pixel patterns, the plurality of fourth pixel patterns, the first common pattern and the plurality of second common patterns. The first pixel pattern overlaps the second common electrode pattern such that the first pixel pattern is substantially parallel to the data line. The second pixel pattern extends from one end of the first pixel pattern and overlaps the third common connecting pattern and the repair pattern. The third pixel pattern extends from the other of the one end of the first pixel pattern and overlaps the metal pattern to be connected to the metal pattern through the drain contact hole. The plurality of fourth pixel patterns extend from the first pixel pattern and are substantially parallel to the second and third pixel patterns. The first common pattern overlaps the first common connecting pattern to be connected to the first common connecting pattern through the common contact hole. The plurality of fourth pixel patterns are disposed between the second and third pixel patterns. The plurality of second common patterns extend from the first common pattern and are alternately arranged with the plurality of fourth pixel patterns.

In the second embodiment, the drain electrode is parallel to the data line instead of the first gate line. Moreover, the second metal pattern extends from the first metal pattern, and the repair pattern extends form the second pixel pattern to overlap the second metal pattern. In the third embodiment, the second repair pattern is disposed between the common line and the first gate line. The second repair pattern is formed of the same layer and the same material as the drain electrode and the metal pattern. However, the second repair pattern has an island shape and is electrically disconnected from both the drain electrode and the metal pattern. The first repair pattern extends from the third pixel pattern to overlap one end of the second repair pattern. The protruding portion of the second pixel electrode extends from the second pixel pattern to overlap the other end of the second repair pattern.

When the TFT in one pixel region is broken or non-functional, the pixel electrode connected to the broken TFT is capable of being connected to the available adjacent TFT. Accordingly, display quality of the LCD device is improved.

It will be apparent to those skilled in the art that various modifications and variations can be made in the organic electroluminescent device and fabricating method thereof of the present disclosure without departing from the spirit or scope of the disclosure. Thus, it is intended that the present disclosure cover the modifications and variations of this disclosure provided they come within the scope of the appended claims and their equivalents.

The invention claimed is:

1. An array substrate for a liquid crystal display device, comprising:
   first and second gate lines on a substrate;
   a data line crossing the first and second gate lines to define first and second pixel regions, respectively;
   a first thin film transistor connected to the first gate line and the data line;
   first and second pixel electrodes in the first and second pixel regions, respectively, the first pixel electrode connected to the first thin film transistor; and
   a first repair pattern crossing over the first gate line, the first repair pattern electrically connected to one of the first thin film transistor and the second pixel electrode,
   wherein the first thin film transistor includes a gate electrode, a semiconductor layer, a source electrode and a drain electrode, and the first pixel electrode is connected to the drain electrode,
   wherein the first repair pattern is electrically connected to the second pixel electrode and overlaps the drain electrode, and
   wherein the first repair pattern is formed of the same layer and the same material as the second pixel electrode.

2. The substrate according to claim 1, wherein each of the first and second pixel electrode includes first to third pixel patterns and a plurality of fourth pixel patterns, the first pixel pattern combining the plurality of fourth pixel patterns, the second and third pixel patterns extending from respective ends of the first pixel pattern, the plurality of fourth pixel patterns spaced apart from each other.

3. The substrate according to claim 2, further comprising:
   a common line and first to third common electrode connecting patterns in the first pixel, the common line parallel to and spaced apart from the first gate line, the first and second common electrode connecting patterns extending from both ends of the common line, the third common electrode connecting pattern combining the first and second common electrode connecting patterns; and
   a common electrode in the first pixel region, the common electrode including a first common pattern and a plurality of second common patterns extending from the first common pattern,
   wherein the plurality of second common patterns are alternately arranged with the plurality of fourth pixel patterns.

4. The substrate according to claim 3, wherein the common electrode is connected to the first common electrode connecting pattern.

5. The substrate according to claim 3, further comprising:
   a gate insulating layer on the common line;
   a metal pattern on the gate insulating layer, the metal pattern overlapping the common line; and
   a passivation layer on the metal pattern,
   wherein the third pixel pattern is connected to the metal pattern, and the common line, the metal pattern constitute a first storage capacitor with the gate insulating layer therebetween.

6. The substrate according to claim 5, wherein the gate insulating layer and the passivation layer are disposed between the second common electrode connecting pattern and the first pixel pattern, and wherein the second common electrode connecting pattern and the first pixel pattern constitute a second storage capacitor with the gate insulating layer and the passivation layer interposed therebetween.

7. The substrate according to claim 6, wherein the gate insulating layer and the passivation layer are disposed between the third common electrode connecting pattern and the second pixel pattern, and wherein the third common electrode connecting pattern and the second pixel pattern constitute a third storage capacitor with the gate insulating layer and the passivation layer interposed therebetween.

8. An array substrate for a liquid crystal display device, comprising:
   first and second gate lines on a substrate;
   a data line crossing the first and second gate lines to define first and second pixel regions, respectively;
   a first thin film transistor connected to the first gate line and the data line;
   first and second pixel electrodes in the first and second pixel regions, respectively, the first pixel electrode connected to the first thin film transistor; and
   a first repair pattern crossing over the first gate line, the first repair pattern electrically connected to one of the first thin film transistor and the second pixel electrode,
   wherein the first thin film transistor includes a gate electrode, a semiconductor layer, a source electrode and a drain electrode, and the first pixel electrode is connected to the drain electrode, wherein the first repair pattern is electrically connected to the drain electrode and overlaps the second pixel electrode, and wherein the first repair pattern is formed of the same layer and the same material as the drain electrode.

9. An array substrate for a liquid crystal display device, comprising:

first and second gate lines on a substrate;

a data line crossing the first and second gate lines to define first and second pixel regions, respectively;

a first thin film transistor connected to the first gate line and the data line;

first and second pixel electrodes in the first and second pixel regions, respectively, the first pixel electrode connected to the first thin film transistor;

a first repair pattern crossing over the first gate line, the first repair pattern electrically connected to one of the first thin film transistor and the second pixel electrode, and a second repair pattern overlapping the first repair pattern and the first pixel electrode, wherein the first thin film transistor includes a gate electrode, a semiconductor layer, a source electrode and a drain electrode, and the first pixel electrode is connected to the drain electrode.

10. The substrate according to claim 9, wherein the first repair pattern is electrically connected to the second pixel electrode.

11. The substrate according to claim 10, wherein the first repair pattern is formed of the same layer and the same material as the second pixel electrode.

12. The substrate according to claim 9, wherein the second repair pattern has an island shape in the first pixel region.

13. The substrate according to claim 12, wherein the second repair pattern is formed of the same material and the same material as the drain electrode.

* * * * *